(12) United States Patent
Padmanaban P C et al.

(10) Patent No.: US 12,282,769 B2
(45) Date of Patent: Apr. 22, 2025

(54) SYSTEM AND METHOD FOR AUTOMATING SRE AND PROJECT MANAGEMENT TOOL METRICS AND CREATING USER DYNAMIC VIEWS

(71) Applicant: JPMorgan Chase Bank, N.A., New York, NY (US)

(72) Inventors: Harish Padmanaban P C, Coimbatore (IN); Karthikeyan Chandrasekaran, Erode (IN); Raghavendra Venkata Chidella, Phoenix, AZ (US); Ganapathi Natarajan, Bangalore (IN); Kiran Gaddala, Edison, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 108 days.

(21) Appl. No.: 18/123,589

(22) Filed: Mar. 20, 2023

(65) Prior Publication Data
US 2024/0264831 A1  Aug. 8, 2024

(30) Foreign Application Priority Data
Feb. 3, 2023  (IN) .............................. 202311007004

(51) Int. Cl.
  *G06F 9/44* (2018.01)
  *G06F 8/73* (2018.01)
  *G06F 8/77* (2018.01)

(52) U.S. Cl.
  CPC . *G06F 8/77* (2013.01); *G06F 8/73* (2013.01)

(58) Field of Classification Search
  None
  See application file for complete search history.

(56) References Cited

U.S. PATENT DOCUMENTS

| | | | |
|---|---|---|---|
| 2022/0012112 A1* | 1/2022 | Wouhaybi | G06F 11/3447 |
| 2022/0113938 A1* | 4/2022 | Jha | G06F 11/076 |
| 2022/0269583 A1* | 8/2022 | Plawecki | G06F 8/77 |
| 2022/0391200 A1* | 12/2022 | Sasikumar | G06F 8/71 |
| 2024/0220321 A1* | 7/2024 | Krishnagi | G06F 9/5016 |

* cited by examiner

*Primary Examiner* — Qamrun Nahar
(74) *Attorney, Agent, or Firm* — GREENBLUM & BERNSTEIN, P.L.C.

(57) ABSTRACT

Various methods, apparatuses/systems, and media for automatically determining whether an application is SRE ready for production deployment are disclosed. A processor implements an AI/ML algorithm and natural language processing algorithm to analyze input data corresponding to an application onboarded onto an application platform; generates an assessment report data that includes SRE readiness score that identifies SRE maturity for the application based on analyzing the input data; determines whether the generated SRE score is equal to or more than a preconfigured assessment score or less than the preconfigured assessment score; automatically determines that the application is SRE ready for production deployment based on determining that the generated SRE score is equal to or more than a preconfigured assessment score; and automatically implements a self-healing algorithm to correct each deficiencies identified in the assessment report.

20 Claims, 9 Drawing Sheets

SYSTEM AND METHOD FOR AUTOMATING SRE AND PROJECT MANAGEMENT TOOL METRICS AND CREATING USER DYNAMIC VIEWS

CROSS-REFERENCE TO RELATED APPLICATIONS

This application claims the benefit of priority from Indian Patent Application No. 202311007004, filed Feb. 3, 2023, which is herein incorporated by reference in its entirety.

TECHNICAL FIELD

This disclosure generally relates to data processing, and, more particularly, to methods and apparatuses for implementing a specification, platform, language, and cloud agnostic automatic site reliability engineering (SRE) module configured to automate SRE and project management tool metrics and create user dynamic views.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, and competitive analysis, to name but a few. SRE is a set of principles and practices that incorporates aspects of software engineering and applies them to infrastructure and operations problems. The main goals for an SRE are to create scalable and highly reliable software systems.

However, currently, there are no tools that may automatically determine whether an application is SRE ready. The challenge being faced in the software industry may be that the assessment criteria, evaluation and finally the certification of an applications tends to be manual in nature. Thus, SRE adoption may prove to be one of the biggest challenge in the industry to see whether its product can adopt to SRE techniques and methods. Typically, on an average, 200 plus man hours are required to be expended by a qualified SRE to apply the SRE criteria. In most cases, PMO (Project Management Office)/scrum master engagement may also be required. There appears to be no automated solution that seamlessly integrates the end-to-end flow of SRE assessment and presents the metrics in a comprehensive fashion. As a result, the quality of software delivered and ultimately customer experience may get compromised.

To address the deficiency imposed by the above problem statement, there is clearly a need to innovate an artificial intelligence (AI) based SRE recommendation engine which signals readiness of a business application for production deployment. Plus, it needs to adhere to a set of best practices termed SRE practices. SRE practices help define thresholds such as Service Level Objectives (SLOs), various Service Level Indicators (SLIs) and the Service Level Agreements (SLAs).

To ensure that an enterprise application is reliable and performant, there is a need to create of an out of box SRE compliance engine which automatically evaluates, validates, recommends, rectifies deficiencies without manual intervention. Currently there is no integrated solution that addresses this gap in the software industry.

SUMMARY

The present disclosure, through one or more of its various aspects, embodiments, and/or specific features or sub-components, provides, among other features, various systems, servers, devices, methods, media, programs, and platforms for implementing a specification, platform, language, and cloud agnostic automatic SRE module configured to automate SRE and project management tool metrics and create user dynamic views, but the disclosure is not limited thereto. For example, the present disclosure, through one or more of its various aspects, embodiments, and/or specific features or sub-components, provides, among other features, various systems, servers, devices, methods, media, programs, and platforms for implementing a platform, language, and cloud agnostic automatic SRE module that implements AI/machine learning (ML) based SRE recommendation engine that outputs information data whether an application is SRE ready, and implements an automatic healing process based on obtained information data corresponding to application performance/health and cost spent on each quarter, but the disclosure is not limited thereto. Moreover, the automatic SRE module, according to exemplary embodiments, automatically evaluates, validates, recommends, rectifies deficiencies without manual intervention, thereby improving the quality of software/application delivered and ultimately improving customer experience in utilizing the software/application.

According to exemplary embodiments, the automatic SRE module can be configured in manner to be implemented in any line of business (LOB) without departing from the scope of the invention as disclosed herein.

According to exemplary embodiments, the application should have minimal required metrics to onboard to an automatic SRE Engine (i.e., JIRA), Logging metrics, RFC's, L2 Model (i.e., level two support team, mostly operations teams), etc. but the disclosure is not limited thereto.

According to exemplary embodiments, a method for automatically determining whether an application is SRE ready for production deployment by utilizing one or more processors along with allocated memory is disclosed. The method may include: establishing a communication link between a processor and a database via a communication interface, the database storing input data corresponding to an application onboarded onto an application platform: calling a corresponding application programing interface (API) to access the database to obtain the input data: implementing an AI/ML algorithm and natural language processing algorithm to analyze the input data: generating an assessment report data that includes SRE readiness score that identifies SRE maturity for the application based on analyzing the input data: determining whether the generated SRE score is equal to or more than a preconfigured assessment score or less than the preconfigured assessment score: automatically determining that the application is SRE ready for production deployment based on determining that the generated SRE score is equal to or more than a preconfigured assessment score; and automatically implementing a self-healing algorithm to correct each deficiencies identified in the assessment report.

According to exemplary embodiments, the input data may include data corresponding to: request for commits (RFCs) data that includes architecture information of the application and design diagrams for each functionalities associated with the application; technical documentation data: logging strategy data; and team culture and release strategy data.

According to exemplary embodiments, the method may further include: determining that the application does not have complete or accurate technical documentation data and RFCs data based on analyzing the input data with prestored technical documentation data and request for commits data associated with the application; and i) allowing an application team to create the technical documentation data and the RFCs data to be utilized for developing the application or ii) implementing an automated workflow process to create the technical documentation data and the RFCs data to be utilized for developing the application.

According to exemplary embodiments, the method may further include: determining that the application does not have functional overview data based on analyzing the input data with prestored functional overview data associated with the application; and implementing an automated workflow process to read the RFCs data and produce the functional overview data for developing the application.

According to exemplary embodiments, the method may further include: determining that the application does not have logging strategy data and proper log patterns based on analyzing the input data with prestored logging patterns and strategy associated with the application: implementing an automated workflow process to output data that recommends the logging patterns as a dependency suitable for the application; and allowing an application team to add the decadency as recommended.

According to exemplary embodiments, the method may further include: determining that the application is not being onboarded to a cloud computing platform (i.e., Service Now) for tracking production maturity: implementing an automated workflow process to provide a token-based functional identifier and an approving official's approval; and automatically onboarding the application to the cloud computing platform based on the token-based functional identifier and the approving official's approval.

According to exemplary embodiments, the method may further include: determining that the application does not have a runbook that includes root cause analysis and escalation matrix associated with the application; and implementing an automated workflow process to create the runbook by utilizing a preconfigured SRE model.

According to exemplary embodiments, the method may further include: determining that the application is not being onboarded to an observability and telemetry platform or determining that the application is being onboarded to the observability and telemetry platform, but does not define accurate SLOs, various SLIs, SLAs, and error budget based on analyzing the input data with prestored data corresponding to the SLOs, SLIs, SLAs, and error budget associated with the application; and implementing an automated workflow process to i) access the application platform: architecture information of the application and design diagrams for each functionalities associated with the application; and technical documentation data: ii) onboard, if already not being onboarded, the application onto the observability and telemetry platform; and iii) publishing the SLOs, SLIs, SLAs, and error budget for the application.

According to exemplary embodiments, the method may further include: determining that the application is not being onboarded onto a project management tool; and implementing an automated workflow process to i) onboard the application onto the project management tool and ii) publish project management methodologies that complete project tasks in small increments and emphasize continuous improvement associated with the application development.

According to exemplary embodiments, the self-healing algorithm may include automatically implementing a monitoring tool, a workflow automation tool, and a telemetry tool.

According to exemplary embodiments, the method may further include: automatically determining that the application is not SRE ready for production deployment based on determining that the generated SRE score is less than the preconfigured assessment score; and allowing a user to onboard the application onto a project management tool or opting for automatic onboarding onto the project management tool.

According to exemplary embodiments, a system for automatically determining whether an application is SRE ready for production deployment is disclosed. The system may include a processor; and a memory operatively connected to the processor via a communication interface, the memory storing computer readable instructions, when executed, may cause a processor to: establish a communication link with a database via the communication interface, the database storing input data corresponding to an application onboarded onto an application platform: call a corresponding API to access the database to obtain the input data: implement an AI/ML algorithm and natural language processing algorithm to analyze the input data; generate an assessment report data that includes SRE readiness score that identifies SRE maturity for the application based on analyzing the input data: determine whether the generated SRE score is equal to or more than a preconfigured assessment score or less than the preconfigured assessment score: automatically determine that the application is SRE ready for production deployment based on determining that the generated SRE score is equal to or more than a preconfigured assessment score; and automatically implement a self-healing algorithm to correct each deficiencies identified in the assessment report.

According to exemplary embodiments, the processor may be further configured to: determine that the application does not have complete or accurate technical documentation data and RFCs data based on analyzing the input data with prestored technical documentation data and request for commits data associated with the application; and i) allow an application team to create the technical documentation data and the RFCs data to be utilized for developing the application or ii) implement an automated workflow process to create the technical documentation data and the RFCs data to be utilized for developing the application.

According to exemplary embodiments, the processor may be further configured to: determine that the application does not have functional overview data based on analyzing the input data with prestored functional overview data associated with the application; and implement an automated workflow process to read the RFCs data and produce the functional overview data for developing the application.

According to exemplary embodiments, the processor may be further configured to: determine that the application does not have logging strategy data and proper log patterns based on analyzing the input data with prestored logging patterns and strategy associated with the application: implement an automated workflow process to output data that recommends the logging patterns as a dependency suitable for the application; and allow an application team to add the decadency as recommended.

According to exemplary embodiments, the processor may be further configured to: determine that the application is not being onboarded to a cloud computing platform (i.e., Service Now) for tracking production maturity: implement an automated workflow process to provide a token-based functional identifier and an approving official's approval; and automatically onboard the application to the cloud computing platform based on the token-based functional identifier and the approving official's approval.

According to exemplary embodiments, the processor may be further configured to: determine that the application does not have a runbook that includes root cause analysis and escalation matrix associated with the application; and implement an automated workflow process to create the runbook by utilizing a preconfigured SRE model.

According to exemplary embodiments, the processor may be further configured to: determine that the application is not being onboarded to an observability and telemetry platform or determining that the application is being onboarded to the observability and telemetry platform, but does not define accurate SLOs, various SLIs, SLAs, and error budget based on analyzing the input data with prestored data corresponding to the SLOs, SLIs, SLAs, and error budget associated with the application; and implement an automated workflow process to i) access the application platform: architecture information of the application and design diagrams for each functionalities associated with the application; and technical documentation data: ii) onboard, if already not being onboarded, the application onto the observability and telemetry platform; and iii) publish the SLOs, SLIs, SLAs, and error budget for the application.

According to exemplary embodiments, the processor may be further configured to: determine that the application is not being onboarded onto a project management tool; and implement an automated workflow process to i) onboard the application onto the project management tool and ii) publish project management methodologies that complete project tasks in small increments and emphasize continuous improvement associated with the application development.

According to exemplary embodiments, a non-transitory computer readable medium configured to store instructions for automatically determining whether an application is SRE ready for production deployment is disclosed. The instructions, when executed, may cause a processor to perform the following: establishing a communication link between a processor and a database via a communication interface, the database storing input data corresponding to an application onboarded onto an application platform; calling a corresponding application programing interface (API) to access the database to obtain the input data; implementing an artificial intelligence (AI)/machine learning (ML) algorithm and natural language processing algorithm to analyze the input data: generating an assessment report data that includes SRE readiness score that identifies SRE maturity for the application based on analyzing the input data: determining whether the generated SRE score is equal to or more than a preconfigured assessment score or less than the preconfigured assessment score; automatically determining that the application is SRE ready for production deployment based on determining that the generated SRE score is equal to or more than a preconfigured assessment score; and automatically implementing a self-healing algorithm to correct each deficiencies identified in the assessment report.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
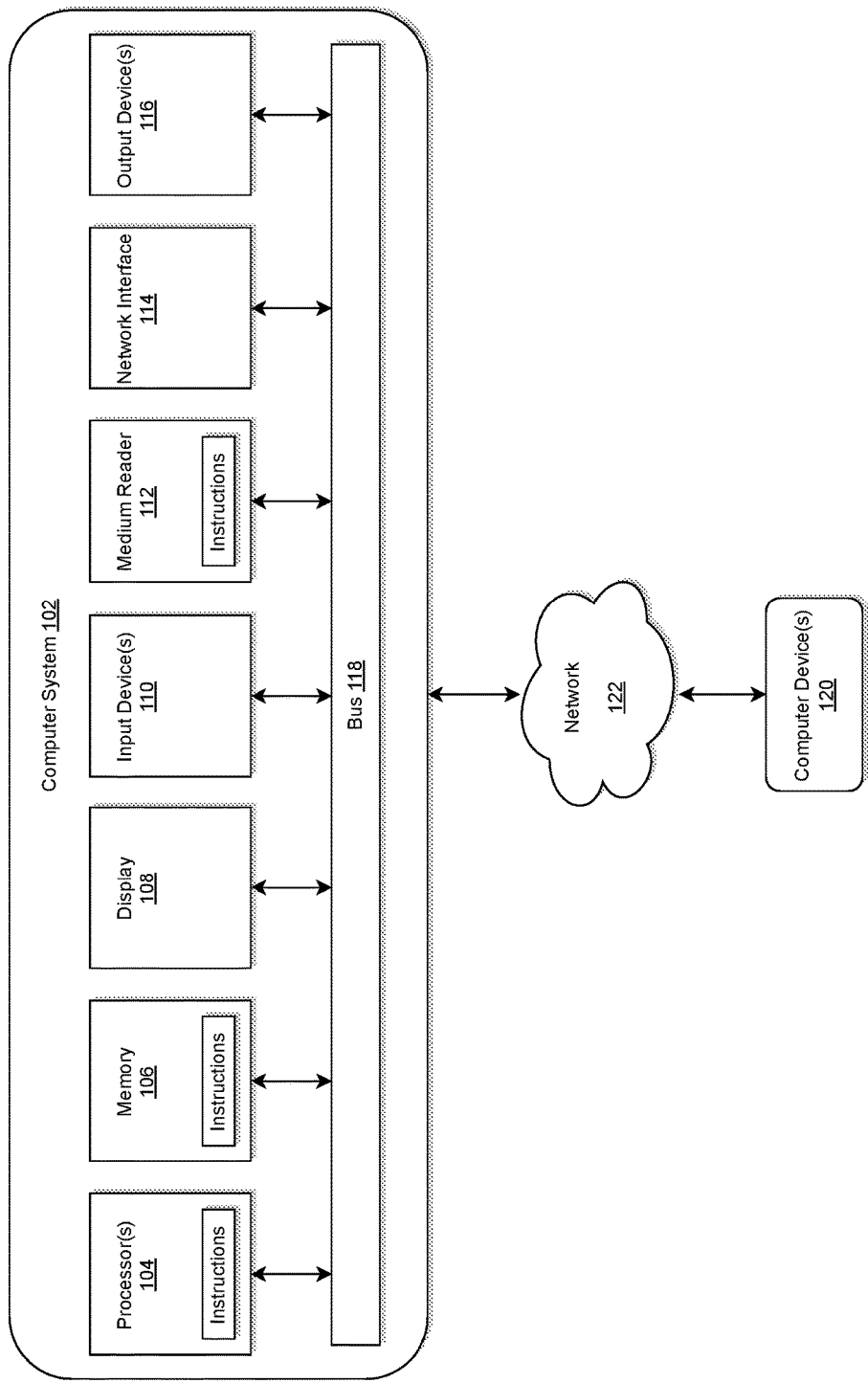
FIG. 1 illustrates a computer system for implementing a specification, platform, language, and cloud agnostic automatic SRE module configured to automate SRE and project management tool metrics and create user dynamic views in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a specification, platform, language, and cloud agnostic automatic SRE module configured to automate SRE and project management tool metrics and create user dynamic views in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the automatic SRE module may be specification, platform, language, and cloud agnostic that may allow for consistent easy orchestration and passing of data through various components to output a desired result regardless of specification, platform, language, and cloud environment. Since the disclosed process, according to exemplary embodiments, is specification, platform, language, and cloud agnostic, the automatic SRE module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
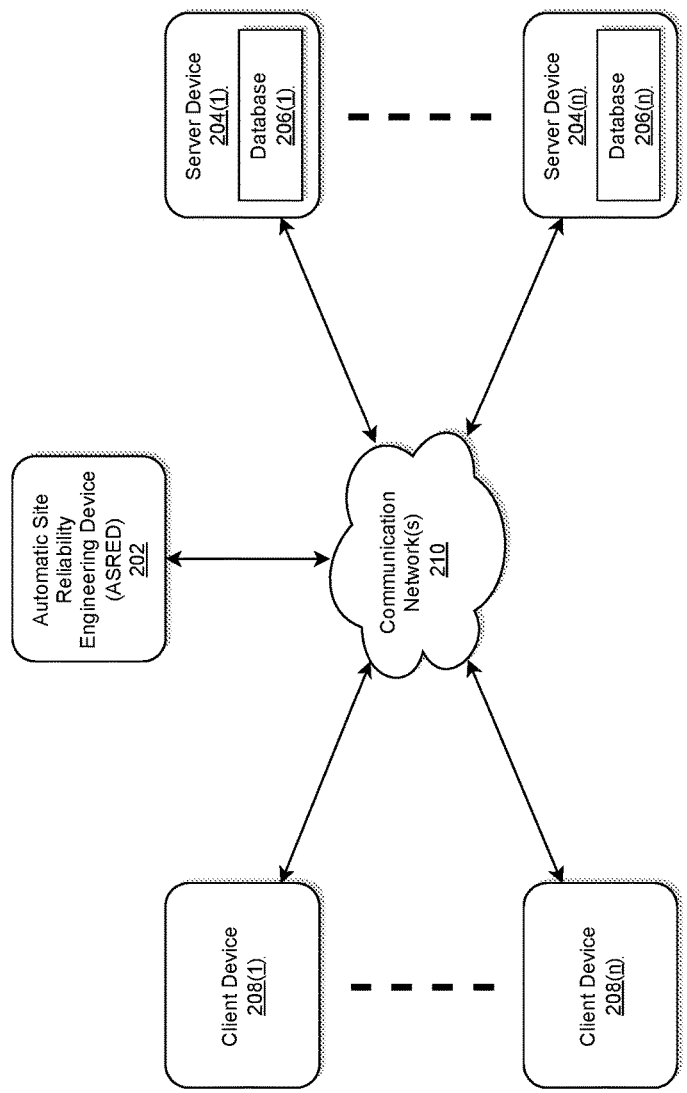
FIG. 2 illustrates an exemplary diagram of a network environment with a specification, platform, language, and cloud agnostic automatic SRE device in accordance with an exemplary embodiment.

Referring to FIG. 2, a schematic of an exemplary network environment 200 for implementing a language, platform, and cloud agnostic automatic SRE device (ASRED) of the instant disclosure is illustrated.

According to exemplary embodiments, the above-described problems associated with conventional tools may be overcome by implementing an ASRED 202 as illustrated in FIG. 2 that may be configured for implementing a specification, platform, language, and cloud agnostic automatic SRE module configured to automate SRE and project management tool metrics and create user dynamic views, but the disclosure is not limited thereto. For example, the above-described problems associated with conventional tools may be overcome by implementing the ASRED 202 as illustrated in FIG. 2 that may be configured for implementing a platform, language, and cloud agnostic automatic SRE module that implements AI/ML based SRE recommendation engine that outputs information data whether an application is SRE ready, and implements an automatic healing process based on obtained information data corresponding to application performance/health and cost spent on each quarter, but the disclosure is not limited thereto. Moreover, the automatic SRE module, according to exemplary embodiments, automatically evaluates, validates, recommends, rectifies deficiencies without manual intervention, thereby improving the quality of software/application delivered and ultimately improving customer experience in utilizing the software/application, but the disclosure is not limited thereto.

The ASRED 202 may be the same or similar to the computer system 102 as described with respect to FIG. 1.

The ASRED 202 may store one or more applications that can include executable instructions that, when executed by the ASRED 202, cause the ASRED 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASRED 202 itself, may be located in virtual server(s) running in a cloud-based computing environment rather than being tied to one or more specific physical network computing devices. Also, the application(s) may be running in one or more virtual machines (VMs) executing on the ASRED 202. Additionally, in one or more embodiments of this technology, virtual machine(s) running on the ASRED 202 may be managed or supervised by a hypervisor.

In the network environment 200 of FIG. 2, the ASRED 202 is coupled to a plurality of server devices 204(1)-204(n) that hosts a plurality of databases 206(1)-206(n), and also to a plurality of client devices 208(1)-208(n) via communication network(s) 210. A communication interface of the ASRED 202, such as the network interface 114 of the computer system 102 of FIG. 1, operatively couples and communicates between the ASRED 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASRED 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASRED 202 may be a standalone device or integrated with one or more other devices or apparatuses, such as one or more of the server devices 204(1)-204(n), for example. In one particular example, the ASRED 202 may be hosted by one of the server devices 204(1)-204(n), and other arrangements are also possible. Moreover, one or more of the devices of the ASRED 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASRED 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ASRED 202 that may efficiently provide a platform for implementing a specification, platform, language, and cloud agnostic automatic SRE module configured to automate SRE and project management tool metrics and create user dynamic views, but the disclosure is not limited thereto. For example, according to exemplary embodiments, the client devices 208(1)-208(n) in this example may include any type of computing device that can facilitate the implementation of the ASRED 202 that may efficiently provide a platform for implementing a specification, platform, language, and cloud agnostic automatic SRE module that implements AI/ML based SRE recommendation engine that outputs information data whether an application is SRE ready, and implements an automatic healing process based on obtained information data corresponding to application performance/health and cost spent on each quarter, but the disclosure is not limited thereto. Moreover, the automatic SRE module implemented within the client devices 208(1)-208(n), according to exemplary embodiments, automatically evaluates, validates, recommends, rectifies deficiencies without manual intervention, thereby improving the quality of software/application delivered and ultimately improving customer experience in utilizing the software/application, but the disclosure is not limited thereto.

The client devices 208(1)-208(n) may run interface applications, such as standard web browsers or standalone client applications, which may provide an interface to communicate with the ASRED 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ASRED 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the ASRED 202, the server devices 204(1)-204(n), or the client devices 208(1)-208(n), for example, may be configured to operate as virtual instances on the same physical machine. For example, one or more of the ASRED 202, the server devices 204(1)-204(n), or the client devices 208(1)-208(n) may operate on the same physical device rather than as separate devices communicating through communication network(s) 210. Additionally, there may be more or fewer ASREDs 202, server devices 204(1)-204(n), or client devices 208(1)-208(n) than illustrated in FIG. 2. According to exemplary embodiments, the ASRED 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
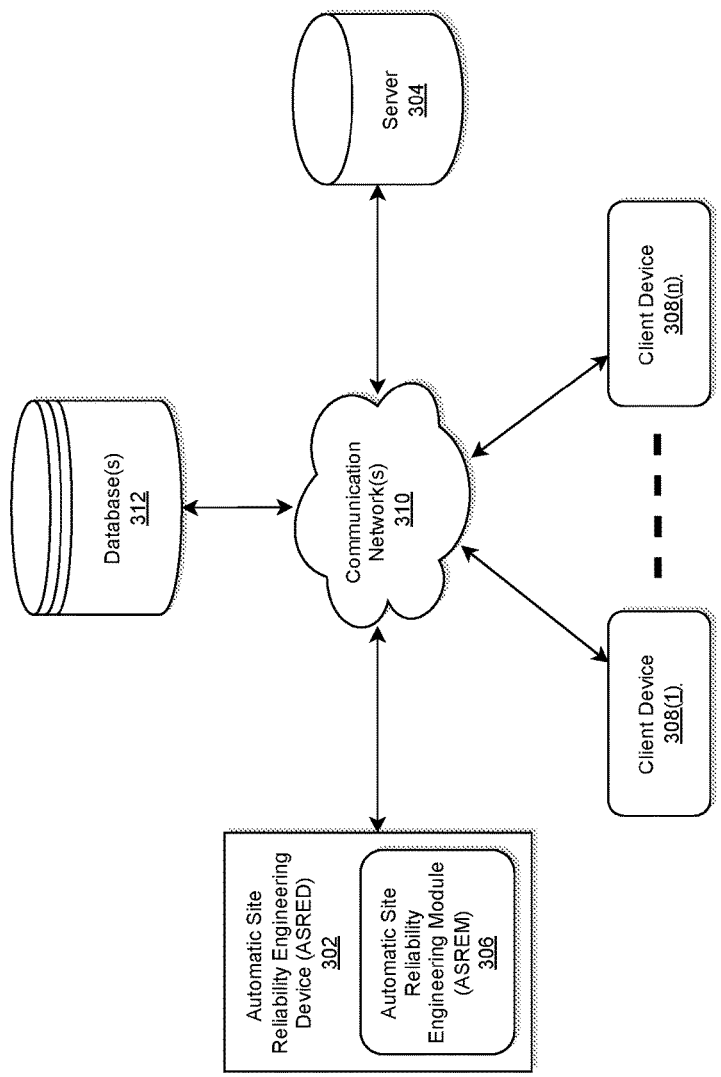
FIG. 3 illustrates a system diagram for implementing a specification, platform, language, and cloud agnostic automatic SRE device having a platform, language, and cloud agnostic automatic SRE module in accordance with an exemplary embodiment.

FIG. 3 illustrates a system diagram for implementing a specification, platform, language, and cloud agnostic ASRED having a specification, platform, language, and cloud agnostic automatic SRE module (ASREM) in accordance with an exemplary embodiment.

As illustrated in FIG. 3, the system 300 may include a ASRED 302 within which an ASREM 306 is embedded, a server 304, a database(s) 312, a plurality of client devices 308(1) ... 308(n), and a communication network 310.

According to exemplary embodiments, the ASRED 302 including the ASREM 306 may be connected to the server 304, and the database(s) 312 via the communication network 310. The ASRED 302 may also be connected to the plurality of client devices 308(1) ... 308(n) via the communication network 310, but the disclosure is not limited thereto.

According to exemplary embodiment, the ASRED 302 is described and shown in FIG. 3 as including the ASREM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the ASREM 306 may be configured to receive real-time feed of data from the plurality of client devices 308(1) ... 308(n) and secondary sources via the communication network 310.

As may be described below, the ASREM 306 may be configured to: establish a communication link with a database via the communication interface, the database storing input data corresponding to an application onboarded onto an application platform: call a corresponding API to access the database to obtain the input data: implement an AI/ML algorithm and natural language processing algorithm to analyze the input data: generate an assessment report data that includes SRE readiness score that identifies SRE maturity for the application based on analyzing the input data: determine whether the generated SRE score is equal to or more than a preconfigured assessment score or less than the preconfigured assessment score; automatically determine that the application is SRE ready for production deployment based on determining that the generated SRE score is equal to or more than a preconfigured assessment score; and automatically implement a self-healing algorithm to correct each deficiencies identified in the assessment report, but the disclosure is not limited thereto.

The plurality of client devices 308(1) ... 308(n) are illustrated as being in communication with the ASRED 302. In this regard, the plurality of client devices 308(1) ... 308(n) may be "clients" (e.g., customers) of the ASRED 302 and are described herein as such. Nevertheless, it is to be known and understood that the plurality of client devices 308(1) ... 308(n) need not necessarily be "clients" of the ASRED 302, or any entity described in association therewith herein. Any additional or alternative relationship may exist between either or both of the plurality of client devices 308(1) ... 308(n) and the ASRED 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) ... 308(n) may communicate with the ASRED 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ASRED 302 may be the same or similar to the ASRED 202 as described with respect to FIG. 2, including any features or combination of features described with respect thereto.

Figure 4:
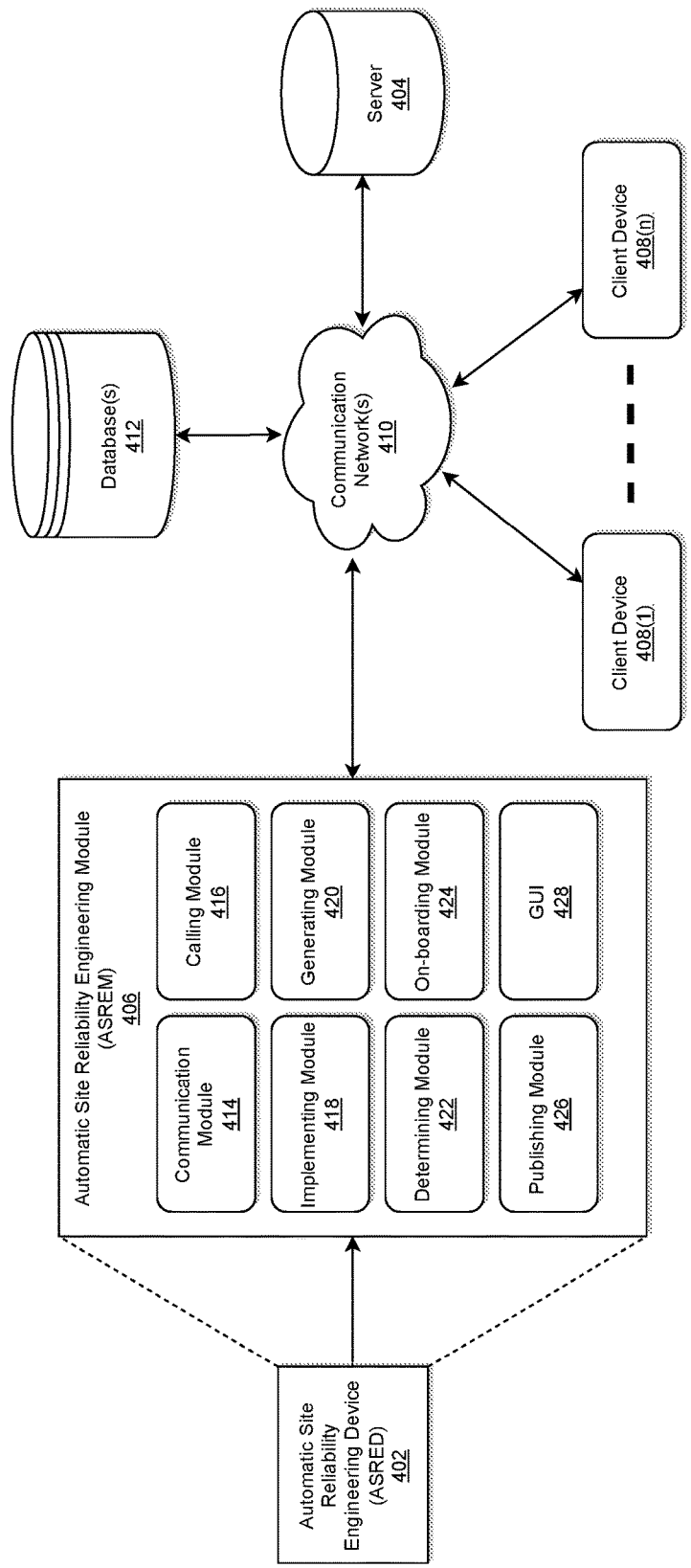
FIG. 4 illustrates a system diagram for implementing a specification, platform, language, and cloud agnostic automatic SRE module of FIG. 3 in accordance with an exemplary embodiment.

FIG. 4 illustrates a system diagram for implementing a specification, platform, language, and cloud agnostic ASREM of FIG. 3 in accordance with an exemplary embodiment.

According to exemplary embodiments, the system 400 may include a specification, platform, language, and cloud agnostic ASRED 402 within which a specification, platform, language, and cloud agnostic ASREM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the ASRED 402 including the ASREM 406 may be connected to the server 404 and the database(s) 412 via the communication network 410. The ASRED 402 may also be connected to the plurality of client devices 408(1)-408(n) via the communication network 410, but the disclosure is not limited thereto. The ASREM 406, the server 404, the plurality of client devices 408(1)-408(n), the database(s) 412, the communication network 410 as illustrated in FIG. 4 may be the same or similar to the ASREM 306, the server 304, the plurality of client devices 308(1)-308(n), the database(s) 312, the communication network 310, respectively, as illustrated in FIG. 3.

According to exemplary embodiments, as illustrated in FIG. 4, the ASREM 406 may include a communication module 414, a calling module 416, an implementing module 418, a generating module 420, a determining module 422, an on-boarding module 424, a publishing module 426, and a GUI 428. According to exemplary embodiments, interactions and data exchange among these modules included in the ASREM 406 provide the advantageous effects of the disclosed invention. Functionalities of each module of FIG. 4 may be described in detail below with reference to FIGS. 4-9.

According to exemplary embodiments, the process implemented by the ASREM 406 may be executed via the communication module 414 and the communication network 410, which may comprise plural networks as described above. For example, in an exemplary embodiment, the various components of the ASREM 406 may communicate with the server 404, and the database(s) 412 via the communication module 414 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
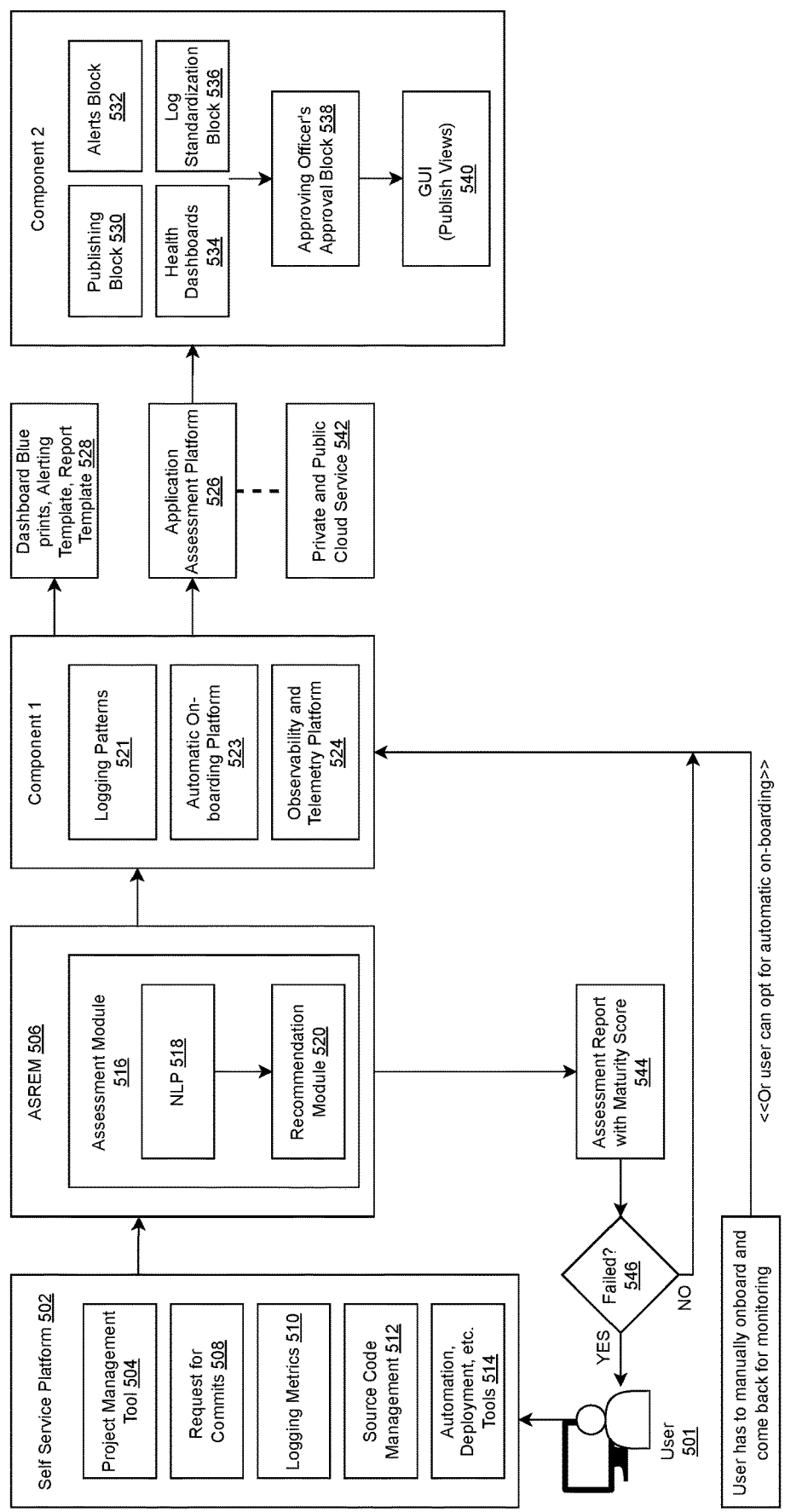
FIG. 5 illustrates an exemplary architecture diagram as implemented by the specification, platform, language, and cloud agnostic automatic SRE module of FIG. 4 in accordance with an exemplary embodiment.

For example, according to exemplary embodiments, the communication module 414 may be configured to establish a communication link between a processor (i.e., processor 104 as illustrated in FIG. 1) and the database 412 via a communication interface (i.e., the network 410), the database 412 storing input data corresponding to an application onboarded onto an application platform (i.e., application assessment platform 526 as illustrated in FIG. 5).

According to exemplary embodiments, the input data may include data corresponding to: RFCs data that includes architecture information of the application and design diagrams for each functionalities associated with the application: technical documentation data: logging strategy data; and team culture and release strategy data, etc., but the disclosure is not limited thereto.

For example, FIG. 5 illustrates an exemplary architecture diagram 500 as implemented by the specification, platform, language, and cloud agnostic ASREM 406 of FIG. 4 in accordance with an exemplary embodiment. As illustrated in FIG. 5, a self-service platform 502 may host a project management tool 504 (i.e., JIRA), RFCs 508, logging metrics 510, source code management 512, and other automation and deployment tools 514 that may provide input data as disclosed above with reference to FIG. 4. The self-service platform may be operatively connected to an ASREM 506 that may include an assessment module 516 that may include a natural language processing (NLP) block 518 and a recommendation module 520. The ASREM 506 may be the same or similar to the ASREM 406 as illustrated in FIG. 4 which may include all of the modules as illustrated in FIG. 4, but the disclosure is not limited thereto.

Referring back to FIGS. 4 and 5, according to exemplary embodiments, the calling module 416 may be configured to call a corresponding API to access the database 412 to obtain the input data. The implementing module 418 may be configured to implement an AI/ML algorithm and natural language processing algorithm (i.e., NLP 518) to analyze the input data. The generating module 420 may be configured to generate an assessment report data that includes SRE readiness score (see, e.g., assessment report with maturity score 544 as illustrated in FIG. 5 that identifies SRE maturity for the application based on analyzing the input data. The determining module 422 may be configured to determine whether the generated SRE score is equal to or more than a preconfigured assessment score or less than the preconfigured assessment score.

According to exemplary embodiments, the determining module 422 may be further configured to automatically determine that the application is SRE ready for production deployment based on determining that the generated SRE score is equal to or more than a preconfigured assessment score. And the implementing module 418 may be configured to automatically implement a self-healing algorithm to correct each deficiencies identified in the assessment report. According to exemplary embodiments, the self-healing algorithm may include automatically implementing a monitoring tool, a workflow automation tool, and a telemetry tool as will be described below with reference to FIGS. 5-8.

Referring back to FIG. 5, the ASREM 506 may be operatively connected to component 1 of the architecture diagram 500 which hosts logging patterns 521, an automatic on-boarding platform 523, and observability and telemetry platform 524. According to exemplary embodiments, the observability and telemetry platform 524 may include a cloud computing platform to help companies manage digital workflows for enterprise operations (i.e., Service Now), automated cloud operations platform (i.e., Dynatrace), data monitoring platform (i.e., Splunk), application monitoring platform (i.e., Kibana), a cloud-based social media marketing platform (i.e., Cortex), a multi-platform open source analytics and interactive visualization web application that provides charts, graphs, and alerts for the web when connected to supported data sources (i.e., Grafana), etc., but the disclosure is not limited thereto.

As illustrated in FIG. 5, if it is determined in block 546 that the maturity score did not meet a predetermined threshold value (i.e., failed), and thereby determined that the application is not SRE ready, a user 501 can manually onboard to the self-service platform 502 and come back for monitoring until the ASREM 506 outputs that the maturity score meets the predetermined threshold value (i.e., passed). Alternatively, the user 501 can opt for automatic on-boarding onto the automatic on-boarding platform 523 by utilizing the on-boarding module 424 (see, FIG. 4).

As illustrated in FIG. 5, component 1 may receive output data from the ASREM 506 and generate output data 528 that may include dashboard blueprints, alerting template, report template. After receiving the output data 528, the application may be hosted onto the application assessment platform 526 which may be operatively connected to private or public cloud services (i.e., Kubernetes platform, AWS, etc.). The application assessment platform 526 may be operatively connected to component 2 of the architecture diagram 500 which may host a publishing block 530, alerts block 532, health dashboards 534, log standardization block 536, an approving officer's approval block 538, and a GUI 540 which publishes views in a comprehensive fashion.

Figure 6:
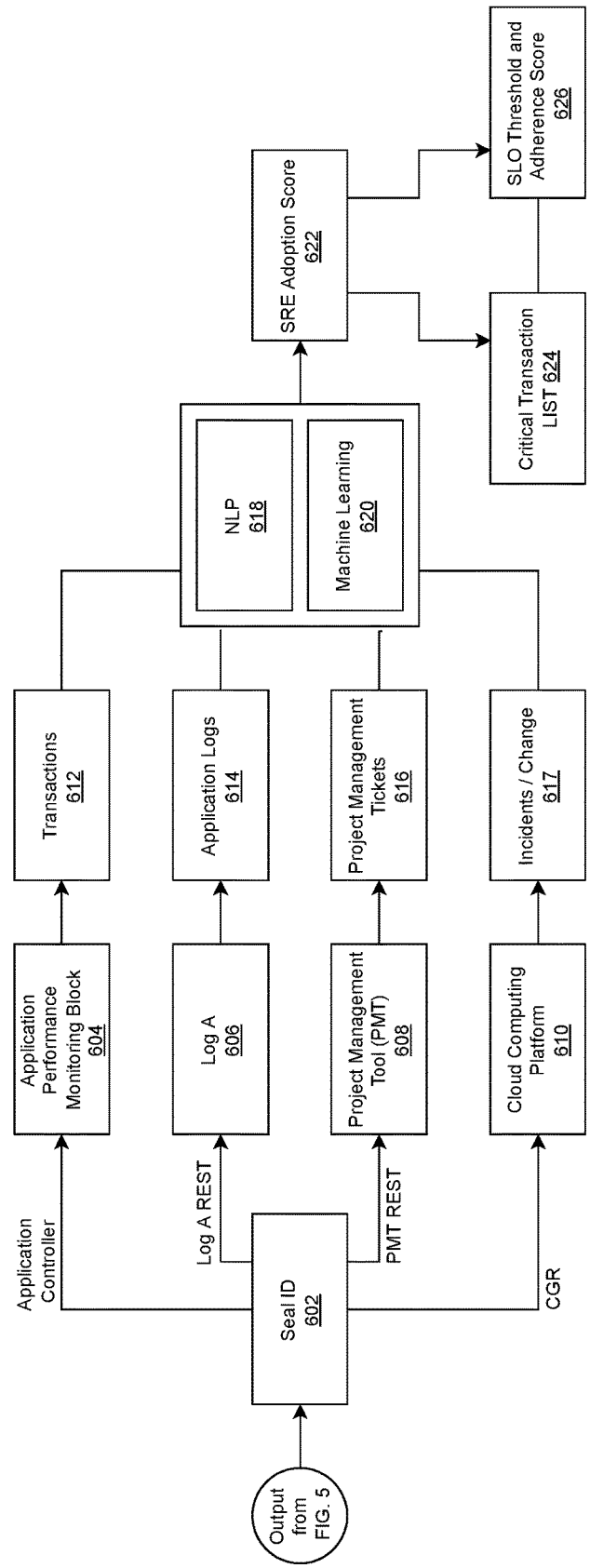
FIG. 6 illustrates an exemplary flow diagram of generating SRE adoption score as implemented by the specification, platform, language, and cloud agnostic automatic SRE module of FIG. 4 in accordance with an exemplary embodiment.

FIG. 6 illustrates an exemplary flow diagram 600 of generating SRE adoption score as implemented by the specification, platform, language, and cloud agnostic ASREM 406 module of FIG. 4 (or ASREM 506 of FIG. 5) in accordance with an exemplary embodiment. As illustrated in FIG. 6, output from FIG. 5 may be assigned a seal identifier (ID) that can be utilized for application controller in the application performance monitoring block 604 for outputting business transactions 612 associated with the application: log A representational state transfer (REST) for log A 606 for implementing a software architectural style that describes a uniform interface between physically separate components, often across the Internet in a client-server architecture and generating application logs 614: project management tool REST for implementing a project management tool 608 (i.e., JIRA) and generating project management tickets (i.e., JIRA tickets); and CGR for cloud computing platform such as Service Now (SNOW) and generating incidents data or change data. According to exemplary embodiments, the transactions 612, application logs 614, JIRA tickets, and incidents or change data 617 may subjected to NLP 618 and machine learning 620 to output SRE adoption score 622 as disclosed herein with reference to FIGS. 4 and 5. The SRE adoption score 622 may be utilized for generating critical transaction list 624 and SLO threshold and adherence score 626 for improving application development and performance.

Figure 7:
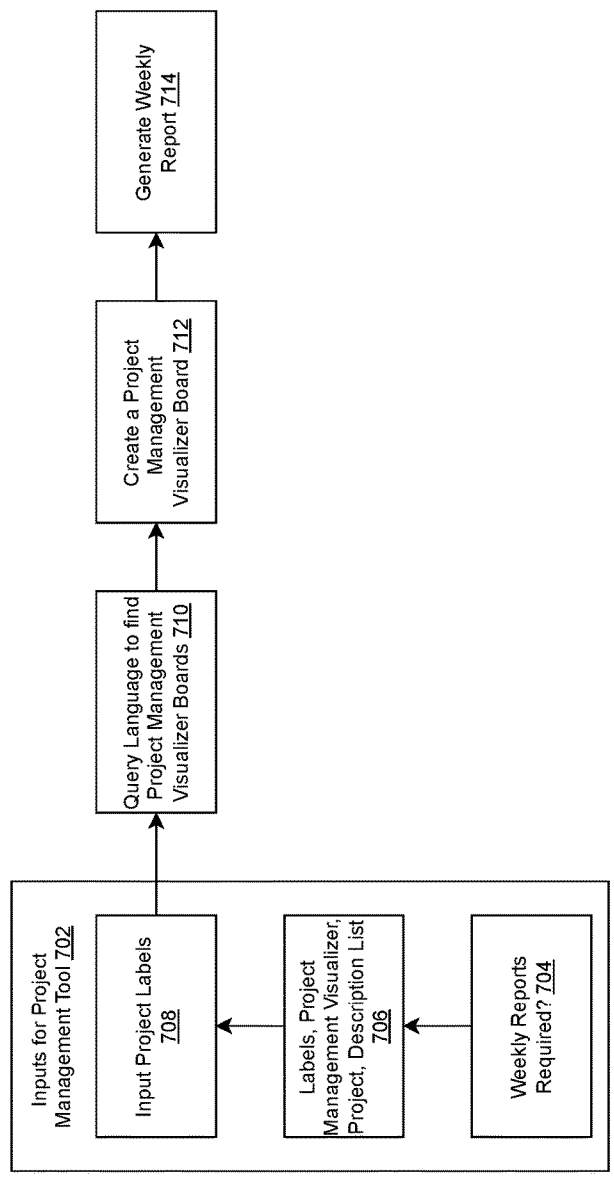
FIG. 7 illustrates an exemplary project management flow diagram as implemented by the specification, platform, language, and cloud agnostic automatic SRE module of FIG. 4 in accordance with an exemplary embodiment.

FIG. 7 illustrates an exemplary project management flow diagram 700 as implemented by the specification, platform, language, and cloud agnostic ASREM 406 module of FIG. 4 (or ASREM 506 of FIG. 5) for inputs for project management tool (i.e., JIRA) 702 in generating/creating weekly report 714 in accordance with an exemplary embodiment. For example, if it is determined that weekly reports are required 704, labels, project management visualizer (i.e., Kanban/Scrum), project, and description list may be generated first at step 706 and then input project labels (i.e., inputs, JIRA project, labels) can be generated at step 708. Based on the inputs for project management tool (i.e., JIRA) 702, at step 710, query language (i.e., JQL) may be utilized to find project management visualizer boards (i.e., Kanban/Scrum boards) which can be utilized to create a project management visualizer board (i.e., a neat Kanban/Scrum board) at step 712. Output from step 712 may be utilized to generate the weekly report at step 714 which can displayed onto the GUI 428 (see FIG. 4) or GUI 540 (see FIG. 5).

Figure 8:
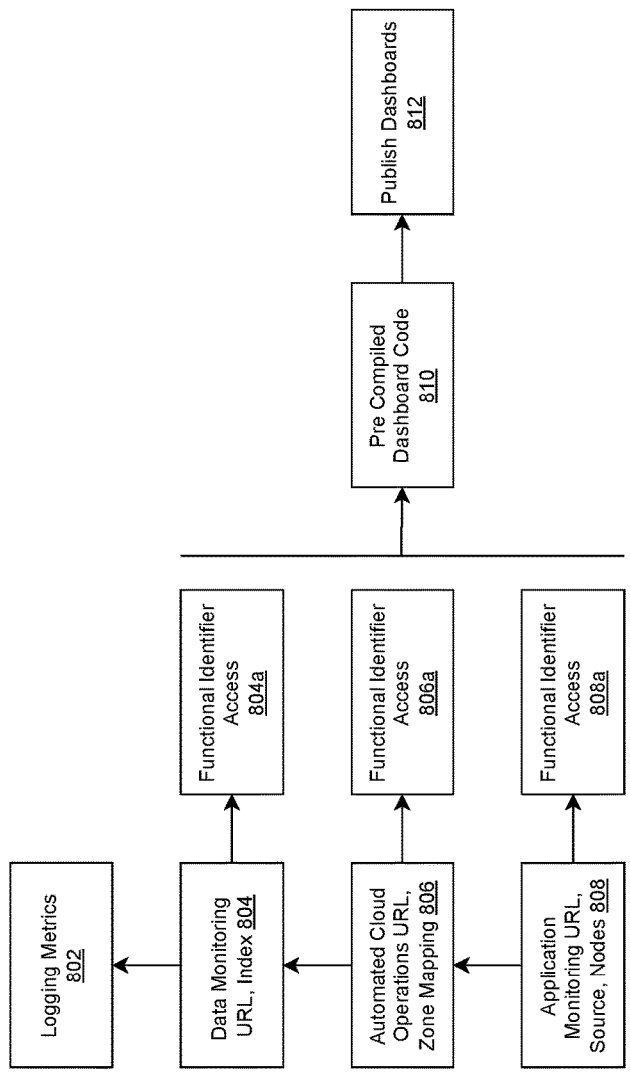
FIG. 8 illustrates an exemplary flow diagram for logging metrics and publishing dashboards as implemented by the specification, platform, language, and cloud agnostic automatic SRE module of FIG. 4 in accordance with an exemplary embodiment.

FIG. 8 illustrates an exemplary flow diagram 800 for logging metrics 802 and publishing dashboards 812 as implemented by the specification, platform, language, and cloud agnostic ASREM 406 module of FIG. 4 (or ASREM 506 of FIG. 5) in accordance with an exemplary embodiment. For example, as illustrated in FIG. 8, at step 808, application monitoring (i.e., Kibana) uniform resource locater (URL), source, and nodes may be generated for corresponding functional ID access 808*a*. At step 806, automated cloud operations (i.e., Dynatrace) URL, zone mapping may be generated for corresponding functional ID access 806*a*. At step 804, data monitoring (i.e., Splunk) URL, index may be generated for corresponding functional ID access 804*a*. Outputs from steps 804, 806, and 808 may be utilized to generate logging metrics 802. The functional ID accesses 804*a*, 806*a*, and 808*a* may utilized for generating pre-compiled dashboard code 810 which can be utilized by the publishing module 426 (see FIG. 4) for publishing dashboards at step 812.

For example, referring back to FIGS. 4-8, according to exemplary embodiments, the determining module 422 may be further configured to determine that the application does not have complete or accurate technical documentation data and RFCs data based on analyzing the input data with prestored technical documentation data and request for commits data associated with the application. The ASREM 406, 506 may i) allow an application team to create the technical documentation data and the RFCs data to be utilized for developing the application or ii) implement, by utilizing the implementing module 418, an automated workflow process to create the technical documentation data and the RFCs data to be utilized for developing the application.

According to exemplary embodiments, the determining module 422 may be further configured to determine that the application does not have functional overview data based on analyzing the input data with prestored functional overview data associated with the application. The implementing module 418 may be configured to implement an automated workflow process to read the RFCs data and produce the functional overview data for developing the application.

According to exemplary embodiments, the determining module 422 may be further configured to determine that the application does not have logging strategy data and proper log patterns based on analyzing the input data with prestored logging patterns and strategy associated with the application. The implementing module 418 may be configured to implement an automated workflow process to output data that recommends the logging patterns as a dependency suitable for the application; and allow an application team to add the decadency as recommended.

According to exemplary embodiments, the determining module 422 may be further configured to determine that the application is not being onboarded to service now for tracking production maturity. The implementing module 418 may be configured to implement an automated workflow process to provide a token-based functional identifier and an approving official's approval. The on-boarding module 424 may be configured to automatically onboard the application to service now based on the token-based functional identifier (i.e., functional ID accesses 804*a*, 806*a*, 808*a* as illustrated in FIG. 8) and the approving official's approval by utilizing the approving officer's approval block 538 as illustrated in FIG. 5.

According to exemplary embodiments, the determining module 422 may be further configured to determine that the application does not have a runbook that includes root cause analysis and escalation matrix associated with the application. The implementing module 418 may be configured to implement an automated workflow process to create the runbook by utilizing a preconfigured SRE model.

According to exemplary embodiments, the determining module 422 may be further configured to determine that the application is not being onboarded to an observability and telemetry platform or determining that the application is being onboarded to the observability and telemetry platform, but does not define accurate SLOs, various SLIs, SLAs, and error budget based on analyzing the input data with prestored data corresponding to the SLOs, SLIs, SLAs, and error budget associated with the application. The implementing module 418 may be configured to implement an automated workflow process to i) access the application platform: architecture information of the application and design diagrams for each functionalities associated with the application; and technical documentation data: ii) onboard, by utilizing the on-boarding module 424, if already not being onboarded, the application onto the observability and telemetry platform 524 (see FIG. 5); and iii) publish, by utilizing the publishing module 426, the SLOs, SLIs, SLAs, and error budget for the application.

According to exemplary embodiments, the determining module 422 may be further configured to determine that the application is not being onboarded onto a project management tool. The implementing module 418 may be configured to implement an automated workflow process to i) onboard, by utilizing the on-boarding module 424 the application onto the project management tool and ii) publish, by utilizing the publishing module 426, the project management methodologies that complete project tasks in small increments and emphasize continuous improvement associated with the application development.

According to exemplary embodiments, each of the communication module 414, the calling module 416, the implementing module 418, the generating module 420, the determining module 422, the on-boarding module 424, the publishing module 426 of the ASREM 406 of FIG. 4 and the assessment module 516 and recommendation module 520 of FIG. 5 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the communication module 414, the calling module 416, the implementing module 418, the generating module 420, the determining module 422, the on-boarding module 424, the publishing module 426 of the ASREM 406 of FIG. 4 and the assessment module 516 and recommendation module 520 of FIG. 5 may be implemented by microprocessors or similar, and may be programmed using software (e.g., microcode) to perform various functions discussed herein and may optionally be driven by firmware and/or software.

Alternatively, according to exemplary embodiments, each of the communication module 414, the calling module 416, the implementing module 418, the generating module 420, the determining module 422, the on-boarding module 424, the publishing module 426 of the ASREM 406 of FIG. 4 and the assessment module 516 and recommendation module 520 of FIG. 5 may be implemented by dedicated hardware, or as a combination of dedicated hardware to perform some functions and a processor (e.g., one or more programmed microprocessors and associated circuitry) to perform other functions.

According to exemplary embodiments, each of the communication module 414, the calling module 416, the implementing module 418, the generating module 420, the determining module 422, the on-boarding module 424, the publishing module 426 of the ASREM 406 of FIG. 4 and the assessment module 516 and recommendation module 520 of FIG. 5 may be called via corresponding API.

Figure 9:
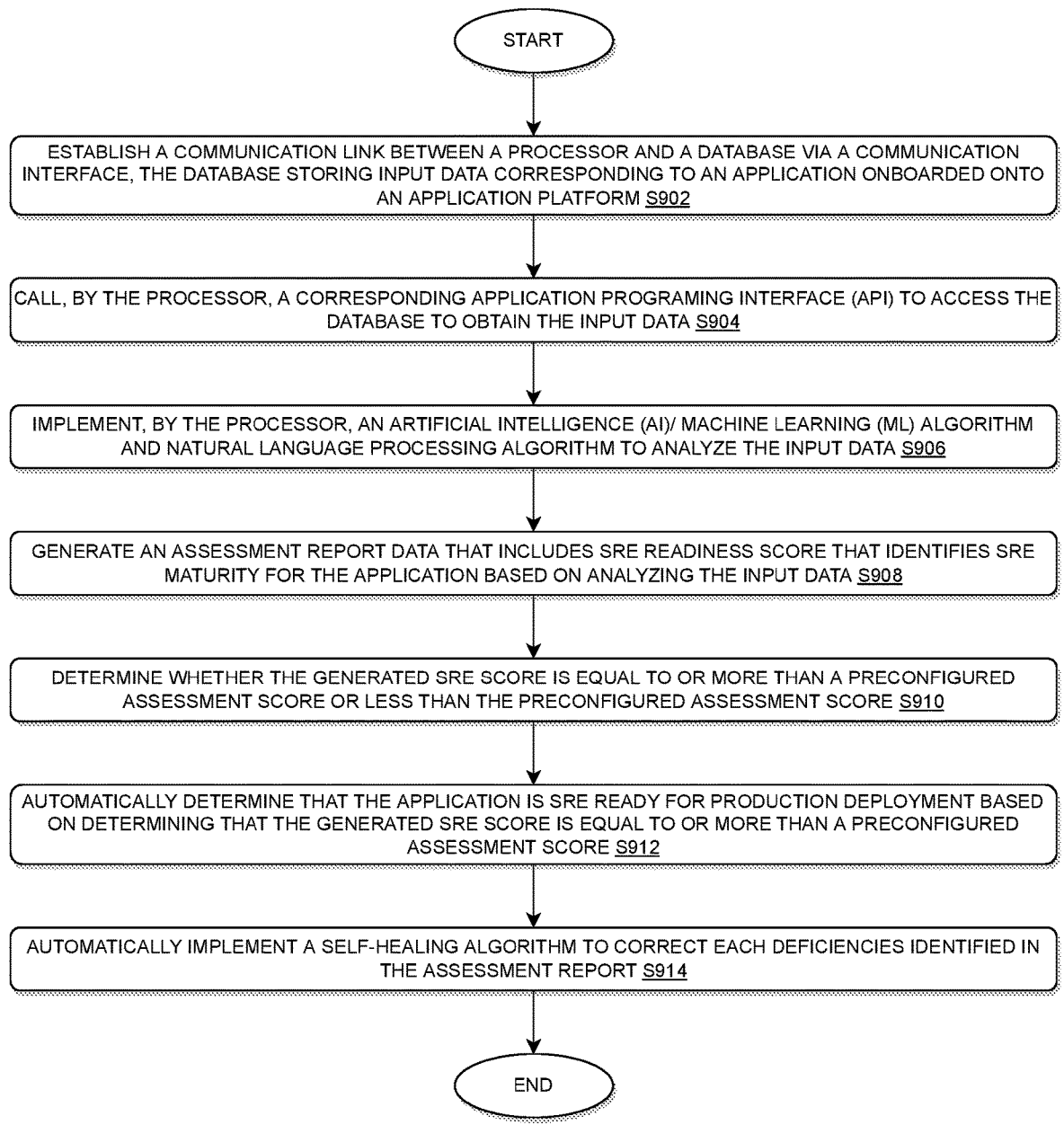
FIG. 9 illustrates an exemplary flow chart implemented by the specification, platform, language, and cloud agnostic automatic SRE module of FIG. 4 for automating SRE and project management tool metrics and creating user dynamic views in accordance with an exemplary embodiment.

FIG. 9 illustrates an exemplary flow chart 900 implemented by the specification, platform, language, and cloud agnostic ASREM 409 of FIG. 4 for automating SRE and project management tool metrics and creating user dynamic views in accordance with an exemplary embodiment. It may be appreciated that the illustrated process 900 and associated steps may be performed in a different order, with illustrated steps omitted, with additional steps added, or with a combination of reordered, combined, omitted, or additional steps.

As illustrated in FIG. 9, at step S902, the process 900 may include establishing a communication link between a processor and a database via a communication interface, the database storing input data corresponding to an application onboarded onto an application platform.

At step S904, the process 900 may include calling a corresponding API to access the database to obtain the input data.

At step S906, the process 900 may include implementing an AI/ML algorithm and natural language processing algorithm to analyze the input data.

At step S908, the process 900 may include generating an assessment report data that includes SRE readiness score that identifies SRE maturity for the application based on analyzing the input data.

At step S910, the process 900 may include determining whether the generated SRE score is equal to or more than a preconfigured assessment score or less than the preconfigured assessment score.

At step S912, the process 900 may include automatically determining that the application is SRE ready for production deployment based on determining that the generated SRE score is equal to or more than a preconfigured assessment score.

At step S914, the process 900 may include automatically implementing a self-healing algorithm to correct each deficiencies identified in the assessment report.

According to exemplary embodiments, in the process 900, the input data may include data corresponding to: request for commits (RFCs) data that includes architecture information of the application and design diagrams for each functionalities associated with the application; technical documentation data: logging strategy data; and team culture and release strategy data, but the disclosure is not limited thereto.

According to exemplary embodiments, the process 900 may further include: determining that the application does not have complete or accurate technical documentation data and RFCs data based on analyzing the input data with prestored technical documentation data and request for commits data associated with the application; and i) allowing an application team to create the technical documentation data and the RFCs data to be utilized for developing the application or ii) implementing an automated workflow process to create the technical documentation data and the RFCs data to be utilized for developing the application.

According to exemplary embodiments, the process 900 may further include: determining that the application does not have functional overview data based on analyzing the input data with prestored functional overview data associated with the application; and implementing an automated workflow process to read the RFCs data and produce the functional overview data for developing the application.

According to exemplary embodiments, the process 900 may further include: determining that the application does not have logging strategy data and proper log patterns based on analyzing the input data with prestored logging patterns and strategy associated with the application: implementing an automated workflow process to output data that recommends the logging patterns as a dependency suitable for the application; and allowing an application team to add the decadency as recommended.

According to exemplary embodiments, the process 900 may further include: determining that the application is not being onboarded to service now for tracking production maturity: implementing an automated workflow process to provide a token-based functional identifier and an approving official's approval; and automatically onboarding the application to service now based on the token-based functional identifier and the approving official's approval.

According to exemplary embodiments, the process 900 may further include: determining that the application does not have a runbook that includes root cause analysis and escalation matrix associated with the application; and implementing an automated workflow process to create the runbook by utilizing a preconfigured SRE model.

According to exemplary embodiments, the process 900 may further include: determining that the application is not being onboarded to an observability and telemetry platform or determining that the application is being onboarded to the observability and telemetry platform, but does not define accurate SLOs, various SLIs, SLAs, and error budget based on analyzing the input data with prestored data corresponding to the SLOs, SLIs, SLAs, and error budget associated with the application; and implementing an automated workflow process to i) access the application platform: architecture information of the application and design diagrams for each functionalities associated with the application; and technical documentation data: ii) onboard, if already not being onboarded, the application onto the observability and telemetry platform; and iii) publishing the SLOs, SLIs, SLAs, and error budget for the application.

According to exemplary embodiments, the process 900 may further include: determining that the application is not being onboarded onto a project management tool; and implementing an automated workflow process to i) onboard the application onto the project management tool and ii) publish project management process 900 ologies that complete project tasks in small increments and emphasize continuous improvement associated with the application development.

According to exemplary embodiments, in the process 900, the self-healing algorithm may include automatically implementing a monitoring tool, a workflow automation tool, and a telemetry tool.

According to exemplary embodiments, the process 900 may further include: automatically determining that the application is not SRE ready for production deployment based on determining that the generated SRE score is less than the preconfigured assessment score; and allowing a user to onboard the application onto a project management tool or opting for automatic onboarding onto the project management tool.

According to exemplary embodiments, the ASRED 402 may include a memory (e.g., a memory 106 as illustrated in FIG. 1) which may be a non-transitory computer readable medium that may be configured to store instructions for implementing a specification, platform, language, and cloud agnostic ASREM 406 for automatically determining whether an application is SRE ready for production deployment as disclosed herein. The ASRED 402 may also include a medium reader (e.g., a medium reader 112 as illustrated in FIG. 1) which may be configured to read any one or more sets of instructions, e.g., software, from any of the memories described herein. The instructions, when executed by a processor embedded within the ASREM 406, or within the ASRED 402, may be used to perform one or more of the methods and processes as described herein. In a particular embodiment, the instructions may reside completely, or at least partially, within the memory 106, the medium reader 112, and/or the processor 104 (see FIG. 1) during execution by the ASRED 402.

According to exemplary embodiments, the instructions, when executed, may cause a processor embedded within the ASREM 406, ASREM 506, or the ASRED 402 to perform the following: establishing a communication link between a processor and a database via a communication interface, the database storing input data corresponding to an application onboarded onto an application platform; calling a corresponding application programing interface (API) to access the database to obtain the input data: implementing an artificial intelligence (AI)/machine learning (ML) algorithm and natural language processing algorithm to analyze the input data: generating an assessment report data that includes SRE readiness score that identifies SRE maturity for the application based on analyzing the input data; determining whether the generated SRE score is equal to or more than a preconfigured assessment score or less than the preconfigured assessment score: automatically determining that the application is SRE ready for production deployment based on determining that the generated SRE score is equal to or more than a preconfigured assessment score; and automatically implementing a self-healing algorithm to correct each deficiencies identified in the assessment report. According to exemplary embodiments, the processor may be the same or similar to the processor 104 as illustrated in FIG. 1 or the processor embedded within ASRED 202, ASRED 302, ASRED 402, and ASREM 406, 506.

According to exemplary embodiments, the instructions, when executed, may further cause the processor 104 to perform the following: determining that the application does not have complete or accurate technical documentation data and RFCs data based on analyzing the input data with prestored technical documentation data and request for commits data associated with the application; and i) allowing an application team to create the technical documentation data and the RFCs data to be utilized for developing the application or ii) implementing an automated workflow process to create the technical documentation data and the RFCs data to be utilized for developing the application.

According to exemplary embodiments, the instructions, when executed, may further cause the processor 104 to perform the following: determining that the application does not have functional overview data based on analyzing the input data with prestored functional overview data associated with the application; and implementing an automated workflow process to read the RFCs data and produce the functional overview data for developing the application.

According to exemplary embodiments, the instructions, when executed, may further cause the processor 104 to perform the following: determining that the application does not have logging strategy data and proper log patterns based on analyzing the input data with prestored logging patterns and strategy associated with the application: implementing an automated workflow process to output data that recommends the logging patterns as a dependency suitable for the application; and allowing an application team to add the decadency as recommended.

According to exemplary embodiments, the instructions, when executed, may further cause the processor 104 to perform the following: determining that the application is not being onboarded to service now for tracking production maturity: implementing an automated workflow process to provide a token-based functional identifier and an approving official's approval; and automatically onboarding the application to service now based on the token-based functional identifier and the approving official's approval.

According to exemplary embodiments, the instructions, when executed, may further cause the processor 104 to perform the following: determining that the application does not have a runbook that includes root cause analysis and escalation matrix associated with the application; and implementing an automated workflow process to create the runbook by utilizing a preconfigured SRE model.

According to exemplary embodiments, the instructions, when executed, may further cause the processor 104 to perform the following: determining that the application is not being onboarded to an observability and telemetry platform or determining that the application is being onboarded to the observability and telemetry platform, but does not define accurate SLOs, various SLIs, SLAs, and error budget based on analyzing the input data with pre-stored data corresponding to the SLOs, SLIs, SLAs, and error budget associated with the application; and implementing an automated workflow process to i) access the application platform; architecture information of the application and design diagrams for each functionalities associated with the application; and technical documentation data: ii) onboard, if already not being onboarded, the application onto the observability and telemetry platform; and iii) publishing the SLOs, SLIs, SLAs, and error budget for the application.

According to exemplary embodiments, the instructions, when executed, may further cause the processor 104 to perform the following: determining that the application is not being onboarded onto a project management tool; and implementing an automated workflow process to i) onboard the application onto the project management tool and ii) publish project management process 900 ologies that complete project tasks in small increments and emphasize continuous improvement associated with the application development.

According to exemplary embodiments, the instructions, when executed, may further cause the processor 104 to perform the following: automatically determining that the application is not SRE ready for production deployment based on determining that the generated SRE score is less than the preconfigured assessment score; and allowing a user to onboard the application onto a project management tool or opting for automatic onboarding onto the project management tool.

According to exemplary embodiments as disclosed above in FIGS. 1-9, technical improvements effected by the instant disclosure may include a platform for implementing a specification, platform, language, and cloud agnostic automatic SRE module configured to automate SRE and project management tool metrics and create user dynamic views, but the disclosure is not limited thereto. According to exemplary embodiments as disclosed above in FIGS. 1-9, technical improvements effected by the instant disclosure may include a platform for implementing a specification, platform, language, and cloud agnostic automatic SRE module that implements AI/ML based SRE recommendation engine that outputs information data whether an application is SRE ready, and implements an automatic healing process based on obtained information data corresponding to application performance/health and cost spent on each quarter, but the disclosure is not limited thereto. Moreover, the automatic SRE module as disclosed with reference to FIGS. 1-9, according to exemplary embodiments, automatically evaluates, validates, recommends, rectifies deficiencies without manual intervention, thereby improving the quality of software/application delivered and ultimately improving customer experience in utilizing the software/application, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically determining whether an application is site reliability engineering (SRE) ready for production deployment by utilizing one or more processors along with allocated memory, the method comprising:
    establishing a communication link between the processor and a database via a communication interface, the database storing input data corresponding to the application onboarded onto an application platform;
    calling a corresponding application programing interface (API) to access the database to obtain the input data;
    implementing an artificial intelligence (AI)/machine learning (ML) algorithm and natural language processing algorithm to analyze the input data;
    generating an assessment report data that includes SRE readiness score that identifies SRE maturity for the application based on analyzing the input data;
    determining whether the generated SRE score is equal to or more than a preconfigured assessment score or less than the preconfigured assessment score;
    automatically determining that the application is SRE ready for production deployment based on determining that the generated SRE score is equal to or more than a preconfigured assessment score; and
    automatically implementing a self-healing algorithm to correct each deficiencies identified in the assessment report.

2. The method according to claim 1, wherein the input data includes data corresponding to: request for commits (RFCs) data that includes architecture information of the application and design diagrams for each functionalities associated with the application;
    technical documentation data; logging strategy data; and team culture and release strategy data.

3. The method according to claim 2, further comprising:
    determining that the application does not have complete or accurate technical documentation data and RFCs data based on analyzing the input data with prestored technical documentation data and request for commits data associated with the application; and
    i) allowing an application team to create the technical documentation data and the RFCs data to be utilized for developing the application or ii) implementing an automated workflow process to create the technical documentation data and the RFCs data to be utilized for developing the application.

4. The method according to claim 2, further comprising:
    determining that the application does not have functional overview data based on analyzing the input data with prestored functional overview data associated with the application; and
    implementing an automated workflow process to read the RFCs data and produce the functional overview data for developing the application.

5. The method according to claim 2, further comprising:
    determining that the application does not have logging strategy data and proper log patterns based on analyzing the input data with prestored logging patterns and strategy associated with the application;
    implementing an automated workflow process to output data that recommends the logging patterns as a dependency suitable for the application; and
    allowing an application team to add the decadency as recommended.

6. The method according to claim 2, further comprising:
    determining that the application is not being onboarded to a cloud computing platform for tracking production maturity;

implementing an automated workflow process to provide a token-based functional identifier and an approving official's approval; and automatically onboarding the application to the cloud computing platform based on the token-based functional identifier and the approving official's approval.

7. The method according to claim 2, further comprising:

determining that the application does not have a runbook that includes root cause analysis and escalation matrix associated with the application; and implementing an automated workflow process to create the runbook by utilizing a preconfigured SRE model.

8. The method according to claim 2, further comprising:

determining that the application is not being onboarded to an observability and telemetry platform or determining that the application is being onboarded to the observability and telemetry platform, but does not define accurate Service Level Objectives (SLOs), various Service Level Indicators (SLIs), Service Level Agreements (SLAs), and error budget based on analyzing the input data with prestored data corresponding to the SLOs, SLIs, SLAs, and error budget associated with the application; and implementing an automated workflow process to i) access the application platform; architecture information of the application and design diagrams for each functionalities associated with the application; and technical documentation data; ii) onboard, if already not being onboarded, the application onto the observability and telemetry platform; and iii) publishing the SLOs, SLIs, SLAs, and error budget for the application.

9. The method according to claim 2, further comprising:

determining that the application is not being onboarded onto a project management tool; and implementing an automated workflow process to i) onboard the application onto the project management tool and ii) publish project management methodologies that complete project tasks in small increments and emphasize continuous improvement associated with the application development.

10. The method according to claim 1, wherein the self-healing algorithm includes automatically implementing a monitoring tool, a workflow automation tool, and a telemetry tool.

11. The method according to claim 1, further comprising:

automatically determining that the application is not SRE ready for production deployment based on determining that the generated SRE score is less than the preconfigured assessment score; and allowing a user to onboard the application onto a project management tool or opting for automatic onboarding onto the project management tool.

12. A system for automatically determining whether an application is site reliability engineering (SRE) ready for production deployment, the system comprising:

a processor; and a memory operatively connected to the processor via a communication interface, the memory storing computer readable instructions, when executed, causes the processor to:

establish a communication link with a database via the communication interface, the database storing input data corresponding to an application onboarded onto the application platform;

call a corresponding application programing interface (API) to access the database to obtain the input data;

implement an artificial intelligence (AI)/machine learning (ML) algorithm and natural language processing algorithm to analyze the input data;

generate an assessment report data that includes SRE readiness score that identifies SRE maturity for the application based on analyzing the input data;

determine whether the generated SRE score is equal to or more than a preconfigured assessment score or less than the preconfigured assessment score;

automatically determine that the application is SRE ready for production deployment based on determining that the generated SRE score is equal to or more than a preconfigured assessment score; and automatically implement a self-healing algorithm to correct each deficiencies identified in the assessment report.

13. The system according to claim 12, wherein the input data includes data corresponding to: request for commits (RFCs) data that includes architecture information of the application and design diagrams for each functionalities associated with the application; technical documentation data; logging strategy data; and team culture and release strategy data.

14. The system according to claim 13, wherein the processor is further configured to:

determine that the application does not have complete or accurate technical documentation data and RFCs data based on analyzing the input data with prestored technical documentation data and request for commits data associated with the application; and i) allow an application team to create the technical documentation data and the RFCs data to be utilized for developing the application or ii) implement an automated workflow process to create the technical documentation data and the RFCs data to be utilized for developing the application.

15. The system according to claim 13, wherein the processor is further configured to:

determine that the application does not have functional overview data based on analyzing the input data with prestored functional overview data associated with the application; and implement an automated workflow process to read the RFCs data and produce the functional overview data for developing the application.

16. The system according to claim 13, wherein the processor is further configured to:

determine that the application does not have logging strategy data and proper log patterns based on analyzing the input data with prestored logging patterns and strategy associated with the application;

implement an automated workflow process to output data that recommends the logging patterns as a dependency suitable for the application; and allow an application team to add the decadency as recommended.

17. The system according to claim 13, wherein the processor is further configured to:

determine that the application is not being onboarded to a cloud computing platform for tracking production maturity;

implement an automated workflow process to provide a token-based functional identifier and an approving official's approval; and automatically onboard the application to the cloud computing platform based on the token-based functional identifier and the approving official's approval.

18. The system according to claim 13, wherein the processor is further configured to:
  determine that the application is not being onboarded to an observability and telemetry platform or determining that the application is being onboarded to the observability and telemetry platform, but does not define accurate Service Level Objectives (SLOs), various Service Level Indicators (SLIs), Service Level Agreements (SLAs), and error budget based on analyzing the input data with prestored data corresponding to the SLOs, SLIs, SLAs, and error budget associated with the application; and
  implement an automated workflow process to i) access the application platform; architecture information of the application and design diagrams for each functionalities associated with the application; and technical documentation data; ii) onboard, if already not being onboarded, the application onto the observability and telemetry platform; and iii) publish the SLO, SLI, SLA, and error budget for the application.

19. The system according to claim 12, wherein the self-healing algorithm includes automatically implementing a monitoring tool, a workflow automation tool, and a telemetry tool.

20. A non-transitory computer readable medium configured to store instructions for automatically determining whether an application is site reliability engineering (SRE) ready for production deployment, the instructions, when executed, cause a processor to perform the following:
  establishing a communication link between the processor and a database via a communication interface, the database storing input data corresponding to the application onboarded onto an application platform;
  calling a corresponding application programing interface (API) to access the database to obtain the input data;
  implementing an artificial intelligence (AI)/machine learning (ML) algorithm and natural language processing algorithm to analyze the input data;
  generating an assessment report data that includes SRE readiness score that identifies SRE maturity for the application based on analyzing the input data;
  determining whether the generated SRE score is equal to or more than a preconfigured assessment score or less than the preconfigured assessment score;
  automatically determining that the application is SRE ready for production deployment based on determining that the generated SRE score is equal to or more than a preconfigured assessment score; and
  automatically implementing a self-healing algorithm to correct each deficiencies identified in the assessment report.

* * * * *